United States Patent [19]

Maples et al.

[11] 4,123,939
[45] Nov. 7, 1978

[54] THERMAL STANDARD

[75] Inventors: Crill Maples; Howard C. Schafer, both of Ridgecrest, Calif.; Richard D. Ulrich, Provo, Utah

[73] Assignee: The United States of America as represented by the Secretary of the Navy, Washington, D.C.

[21] Appl. No.: 788,862

[22] Filed: Apr. 19, 1977

[51] Int. Cl.² ............................................. G01J 5/12
[52] U.S. Cl. ............................. 73/190 H; 73/355 R
[58] Field of Search ............ 73/190 H, 190 EW, 340, 73/341, 342, 355 R; 136/213, 224, 230

[56] References Cited

U.S. PATENT DOCUMENTS

| | | | |
|---|---|---|---|
| 2,785,860 | 3/1957 | Harrison et al. | 73/355 X |
| 2,825,222 | 3/1958 | Stone | 73/15 |
| 2,873,302 | 2/1959 | Gibbens | 136/213 |
| 3,033,985 | 5/1962 | Petree | 73/355 X |
| 3,267,727 | 8/1966 | Benzinger | 73/190 |
| 3,313,154 | 4/1967 | Bruce | 73/355 X |
| 3,348,978 | 10/1967 | Teague | 136/230 X |
| 3,700,503 | 10/1972 | Fletcher | 136/213 X |
| 3,738,168 | 6/1973 | Mansell | 73/190 |

*Primary Examiner*—Herbert Goldstein
*Attorney, Agent, or Firm*—R. S. Sciascia; Roy Miller; Kenneth G. Pritchard

[57] ABSTRACT

The invention disclosed is a device capable of sensing and recording the total thermal energy received by an object in a given location. The device can sense the energy received from any direction by any source of thermal energy. The sensors are attached to a recorder so that variations over time can be observed.

7 Claims, 1 Drawing Figure

U.S. Patent
Nov. 7, 1978
4,123,939
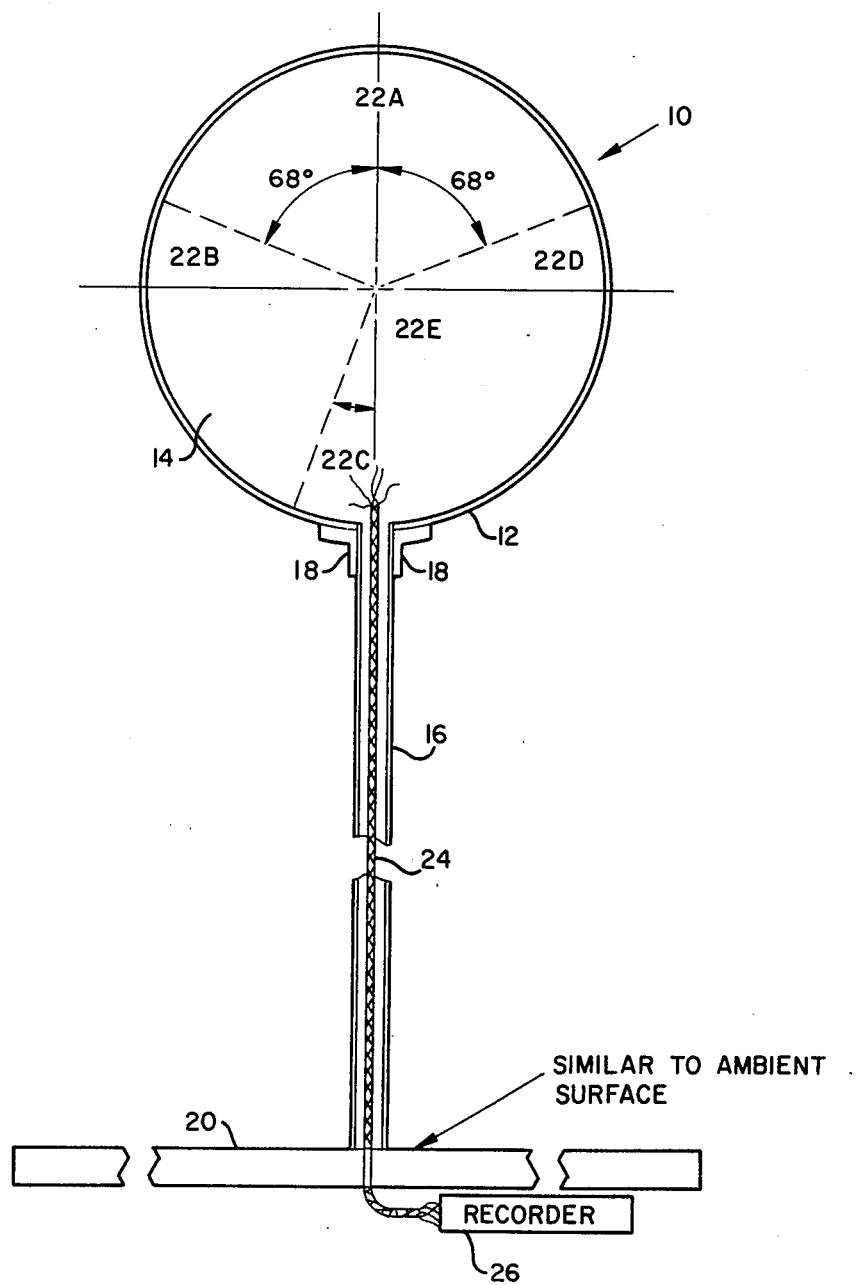

THERMAL STANDARD

BACKGROUND OF THE INVENTION

This invention relates to energy sensors and in particular to thermal energy sensors.

Many items are either stored or used in outdoor or field conditions. The testing of such items for weathering and other problems associated with prolonged exposure has been through the use of simulation ovens. The testing has been controlled by a single temperature location on the item.

This procedure overlooks the different effects of convection and radiation heating at various locations on the items. For an object suspended in space, there are many thermal forcing functions effecting it. These include the sun, wind, reflected solar radiation, ground radiation, as well as uneven heat losses from the object.

Frequently, one of the most important weathering factors to be considered is the one caused by temperature gradients from uneven heating. To test the useful lifetime of objects in any given location, actual field tests have been needed. New simulation ovens will permit duplication of gradient problems in any location. These ovens require the thermal pattern of the desired location.

Previous methods relied solely on the air temperature at the location. This ignores the different contributions of the thermal forcing functions noted previously.

SUMMARY OF THE INVENTION

The disclosed invention is a body with temperature sensors, such as thermocouples, spread over and throughout it. The sensors can be as numerous as desired. The total thermal energy received is thus determined with sufficient accuracy to know the temperature gradient across the object. The output of the sensors is fed to a recorder which makes a permanent log of the temperature and gradient variations with time.

An object of the invention is to provide an apparatus capable of measuring the temperature pattern experienced by objects in a given location. A further object of the invention is to record the variations of this pattern with respect to time. Still another object of the invention is to provide a thermal integrant standard, an apparatus that collects all heat no matter what the source.

BRIEF DESCRIPTION OF THE DRAWING

The FIGURE is a schematic cross-section of one embodiment of the present invention.

DESCRIPTION OF THE PREFERRED EMBODIMENT

The single FIGURE shows a schematic of the present invention. It consists of a receiving body 10 which absorbs thermal energy from its surroundings. A sphere is shown but a cylinder or any shape desired could be used. The sphere consists of a stainless steel shell 12 and filler 14 which is an insulating material made from a low thermal conductor, such as rubber.

Stainless steel has been used for its durability in maintaining constant thermal coefficients. Filler 14 has been made of rubber. Rubber is used because it gives the inside of sphere 10 conductivity which is lower by an order of magnitude than the stainless steel shell 12. It is felt that rubber makes body 10 typical of solid items left outside which experience thermal gradients.

Receiving body 10 is mounted on support 16 by clamps 18. Support 16 is attached to a base 20 or driven directly into the ground. If on a base 20, the base should be composed of material similar to the ambient surface so as to reflect proper thermal characteristics of the region being studied.

Within the sphere, thermocouples 22 are placed. Five thermocouples are shown, but as many as needed or desired can be used. Four, 22A through 22D, are located under the metal shell 12. They correspond to the general locations of top, bottom, east and west. The bottom one, 22C is shown at an arbitrary angle of 20° off actual bottom so it won't be screened by the support 16. If true bottom is desired, support 16 can be modified by various ways. The east and west thermocouples, 22B and 22D are set at an arbitrary angle less than 90° from the vertical. This is because the horizon is usually cluttered. Raising the angle as shown is a more reliable way to account for solar effects. The east, west, and top thermocouples respectively provide for morning evening and noon day solar heating effects.

The final thermocouple, 22E is located at the center of the sphere. Knowing the actual temperature at the center of the sphere and at various locations near the surface permits simple calculations of radial gradients. This establishes the gradient within filler 14 in the direction of each of the other thermocouples. The thermocouples are attached by wires 24 to recorder 26. This permits a continuous log to be made of shifting thermal effects.

Thermocouples 22 are shown as divided semi-circles. This represents two metals joined together. A pair of wires are connected to each thermocouple from the group of wires 24. Each wire is shown connected to a different half of the thermocouple. Metal sphere 12 does not serve as part of the thermocouple connection in any way.

We claim:

1. A thermal environment monitor comprising:
   a receiving body for absorbing thermal energy from all directions;
   insulating material which is a low thermal conductor placed within said receiving body for supporting a thermal gradient across said receiving body when said thermal energy has a spatial variation;
   a plurality of temperature sensors distributed over and/or through said insulating material within said receiving body such that the temperature at said sensors can be used to calculate the temperature gradients throughout said insulating material;
   a stand for supporting the receiving body a predetermined distance from the ground connected to said receiving body; and
   a recorder operatively connected to the temperature sensors for logging the temperatures observed at each sensor over a period of time, whereby calculations of the temperature gradient as a function of time can be made.

2. A thermal environment monitor as described in claim 1 where the temperature sensors are thermocouples.

3. A thermal environment monitor as described in claim 1 where the sphere is made of stainless steel.

4. A thermal environment monitor as described in claim 3 where the plurality of temperature sensors totals five and they are placed such that one is located at the center of said insulating material and the rest between said steel sphere and said insulating material with one on the side receiving morning sunlight, one on the side receiving noon day sunlight, one on the side receiving setting sunlight and one of the side against or facing the ground.

5. A thermal environment monitor as described in claim 1 where the insulating material is rubber.

6. A thermal environment monitor comprising:
   a stainless steel receiving body for absorbing thermal energy from all directions;
   insulating material within said receiving body which is a low thermal conductor for supporting a thermal gradient across said receiving body;
   a plurality of thermocouples within said receiving body and distributed over and/or throughout said insulating material such that the thermal gradients in said receiving body can be calculated from the individual temperature measurements of said thermocouples;
   a stand for supporting the receiving body a predetermined distance from the ground connected to said receiving body; and
   a recorder operatively connected to said thermocouples for logging the temperatures observed at each thermocouple.

7. A thermal environment monitor as described in claim 6 where the insulating material is rubber.

* * * * *